Oct. 23, 1934.  R. J. HURT  1,978,204
PROCESS OF SEPARATING RUBBER FROM METAL IN A COMPOSITE ARTICLE
Filed May 16, 1934
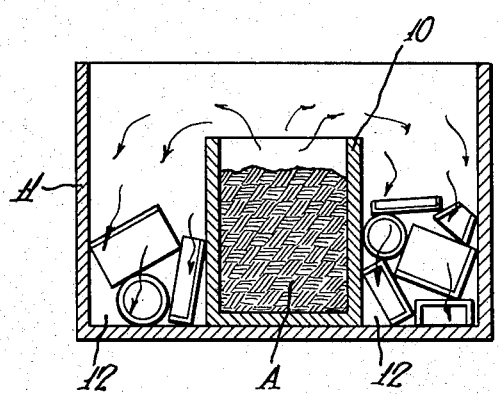
INVENTOR
Roy J. Hurt
BY
ATTORNEYS Patented Oct. 23, 1934

1,978,204

UNITED STATES PATENT OFFICE 1,978,204

PROCESS OF SEPARATING RUBBER FROM METAL IN A COMPOSITE ARTICLE

Roy J. Hurt, Clarendon Hills, Ill.

Application May 16, 1934, Serial No. 725,890

7 Claims. (Cl. 18—52)

It is common practice in the manufacture of many articles such as automobiles, tires, airplanes, refrigerators, etc., to harden or cure rubber directly onto a piece of metal by the use of heat or heat and pressure, so that the two materials become firmly bonded together to form a composite article. Sometimes these articles may be defective as a result of the materials or workmanship employed, so that it is desirable to recover their component parts. Furthermore, when such composite products have outlived their usefulness, both the metal and the rubber have waste product values.

An example of such an article is the running board of an automobile. Such a board often comprises a metal stamping covered with a layer of rubber which has been bonded thereto during the curing process. In the making of tires it is common practice to employ a curing bag to hold the tire in shape during the curing of the rubber. This curing bag is made of rubber and has a metal valve molded or bonded thereto. The rubber in this curing bag is only good for a certain number of operations after which it must be renewed. It is desirable under these conditions to separate the metal valve from the rubber bag and at the same time salvage both the rubber and the valve.

In order to recover the metal portions of the composite articles, it has been the custom to burn the rubber away from the metal, but this destroys the rubber and sometimes injuries the metal parts.

One object of the present invention is to provide a process for easily separating the rubber and metal components of a composite article of the character described, in such a manner that these materials can be salvaged.

In carrying out the present invention, the composite article is treated to an extremely low temperature. The metal contracts to a differing extent than does the rubber. At the same time the rubber becomes frozen into a brittle condition. Thus the metal draws away from the rubber sufficiently to permit the rubber to be easily removed from the metal, or permits the rubber to be more easily broken loose from the metal. The pieces of rubber and the metal separated are thus salvaged for reuse.

As an important feature of my invention, the composite article is subjected to the action of a liquefied or solidifier gas, either by direct immersion therein or direct contact therewith, or by subjecting it to the gases as they are driven off, and while said gases are at extremely low temperature. The gas used is one having a very low boiling or subliming temperature at atmospheric pressure, such as air, oxygen, nitrogen, carbon dioxide and the like.

The manner in which my process is carried out depends on the character of the composite article to be salvaged. In certain cases, for instance, where the contacting or bonded surfaces between the rubber and metal are somewhat regular, the composite article may be treated with the cold gases that are evaporated from the liquid. In cases where the surfaces between the rubber and metal of the article are more intricate, it may be necessary to immerse the article in the liquefied gas itself.

In certain processes it has been found advantageous to precool the composite article to be salvaged by subjecting it to the gases given off from the liquefied gas, while said gases are still at extremely low temperature, and then immersing it into the bath of liquefied gas.

In the accompanying drawing, there is shown for the purpose of illustration, a somewhat diagrammatic vertical section through an apparatus which may be used for carrying out my invention.

In the apparatus shown, there is provided a container 10 adapted to receive a body of liquefied gas A which may be any of the gases stated which are liquid or solid only at extremely low temperatures at atmospheric pressure. This container may be insulated if desired, and open at the top as shown. Surrounding this container 10 is a large open-top container 11 forming with the peripheral wall of said container 10 an article receiving space 12. This outer container 11 may also be insulated, if desired.

In carrying out my process, the composite articles to be treated are placed in the space 12 between the peripheral walls of the containers 10 and 11. The gases given off by the liquefied gas A, being extremely cold, will be heavier than the surrounding air and will flow downwardly into the space 12 and into intimate contact with the composite articles disposed therein.

In certain cases according to the character of the composite article to be treated, the metal parts will shrink sufficiently from the rubber and the rubber will be sufficiently frozen by this treatment so that the rubber may be separated from the metal without immersing the article in the liquefied gas. However, if the article is of such a character as to require further treatment, the composite article, after being precooled as described, is immersed in the liquefied gas A. This immersion will cause an increase in the rate with which the gases will be driven off from the body of liquefied gas A and with which said gases will come into contact with the articles remaining in the space 12, thereby increasing the efficiency of the precooling action.

If the inner container 10 is not insulated, there will be a transfer of heat from the composite articles in the space 12 through the walls of the container 10 and into the bath of liquefied gas. The question of insulating this inner container 10 therefore depends entirely upon the temperature to which it is desired to cool the composite articles, and upon the nature of the articles being treated. It is advantageous in cases where the container 10 is not insulated to remove the articles nearest to the walls of the container either for subsequent immersion in the bath of liquefied gas A or for removal of the rubber from the metal, and moving the more remote articles nearer to the container 10.

The process may also be carried out through the use of a storage tank for the liquefied gases, the normal evaporation from this tank being arranged to give the required cooling action or precooling action to the composite articles. The cold gases may be caused to flow in counter current relationship to a row of the articles on a suitable conveyer.

While the articles are at low temperature, the rubber may be readily broken off from the metal by the use of any suitable tool if the parts do not break apart due to the wide difference in the extent to which they contract during the lowering of the temperature.

Having thus described my invention, what I claim as new and desire to secure by Letters Patent is:—

1. The process of separating the rubber and the metal parts of a composite article in which said rubber is bonded onto the metal, said process comprising subjecting the composite article to a very low temperature to shrink the metal in respect to the rubber and to break or weaken the bond between said materials.

2. The process of separating rubber from metal in a composite article in which said rubber is bonded onto the metal, which comprises freezing the rubber to render it brittle, and breaking the brittle rubber from the metal.

3. The process of treating a composite article in which a rubber material is molded onto a metal part, which comprises subjecting said composite article to the action of a liquefied gas having a very low temperature at atmospheric pressure, and separating the rubber and metal while at a low temperature.

4. The process of treating a composite article in which a rubber material is bonded onto a metal part, which includes causing the cold gases evaporated from a liquefied gas having a very low temperature at atmospheric pressure to come into contact with the article to contract the metal part in respect to the rubber material, and render said rubber material easily removable from said metal part.

5. The process of treating a composite article in which a rubber material is bonded onto a metal part, which includes immersing said composite article in liquid air to contract the metal and at the same time render the rubber brittle.

6. The process of separating rubber from metal in a composite article in which said rubber is hardened onto said metal, which comprises subjecting the composite article to the action of gases directly evolved from solid carbon dioxide to thereby shrink the metal in respect to the rubber and render the rubber brittle and easily removable from said metal.

7. The process of separating rubber from metal in a composite article in which said rubber is bonded onto said metal, which comprises precooling said composite article by the action of the cold gases evaporated from a liquefied gas having a very low boiling point, then immersing said article in said liquefied gas, and then breaking the rubber from the metal.

ROY J. HURT.